United States Patent
Chen et al.

(10) Patent No.: US 10,338,227 B2
(45) Date of Patent: Jul. 2, 2019

(54) GNSS SIGNAL PROCESSING WITH IONOSPHERE MODEL FOR SYNTHETIC REFERENCE DATA

(71) Applicant: Trimble Inc., Sunnyvale, CA (US)

(72) Inventors: Xiaoming Chen, Hoehenkirchen (DE); Ralf Drescher, Hoehenkirchen (DE); Rodrigo Leandro, Ottobrunn (DE)

(73) Assignee: Trimble Inc., Sunnyvale, CA (US)

( * ) Notice: Subject to any disclaimer, the term of this patent is extended or adjusted under 35 U.S.C. 154(b) by 624 days.

(21) Appl. No.: 14/863,319

(22) Filed: Sep. 23, 2015

(65) Prior Publication Data

US 2016/0011314 A1 Jan. 14, 2016

Related U.S. Application Data

(62) Division of application No. 13/372,488, filed on Feb. 13, 2012, now Pat. No. 9,170,335.

(60) Provisional application No. 61/442,680, filed on Feb. 14, 2011.

(51) Int. Cl.
  *G01S 19/07* (2010.01)
  *G01S 19/43* (2010.01)
  *G01S 19/45* (2010.01)
  *G01S 19/44* (2010.01)

(52) U.S. Cl.
  CPC ............ *G01S 19/07* (2013.01); *G01S 19/43* (2013.01); *G01S 19/44* (2013.01); *G01S 19/45* (2013.01)

(58) Field of Classification Search
  CPC .......... G01S 19/07; G01S 19/04; G01S 19/32; G01S 19/43; G01S 19/44; G01S 19/45
  See application file for complete search history.

(56) References Cited

U.S. PATENT DOCUMENTS

| 5,311,194 | A |   | 5/1994  | Brown |
| 5,323,322 | A | * | 6/1994  | Mueller ............... G01S 5/0009 342/357.27 |
| 5,828,336 | A |   | 10/1998 | Yunck et al. |

(Continued)

FOREIGN PATENT DOCUMENTS

| CN | 101943749 A | 1/2011 |
| EP | 1 862 809 A1 | 12/2007 |

(Continued)

OTHER PUBLICATIONS

International Search Report and Written Opinion of the International Searching Authority dated May 31, 2011 in International Application No. PCT/US2010/002565 (six pages).

(Continued)

*Primary Examiner* — Vladimir Magloire
*Assistant Examiner* — Daniel P Malley, Sr.
(74) *Attorney, Agent, or Firm* — Kilpatrick Townsend & Stockton LLP

(57) ABSTRACT

Some embodiments of the present invention derive an ionospheric phase bias and an ionospheric differential code bias (DCB) using an absolute ionosphere model, which can be estimated from data obtained from a network of reference stations or obtained from an external source such as WAAS, GAIM, IONEX or other. Fully synthetic reference station data is generated using the ionospheric phase bias and/or the differential code bias together with the phase leveled clock and ionospheric-free code bias and/or MW bias.

29 Claims, 10 Drawing Sheets

(56) References Cited

U.S. PATENT DOCUMENTS

| | | | |
|---|---|---|---|
| 5,893,044 A | 4/1999 | King et al. | |
| 6,295,021 B1 | 9/2001 | Lichten et al. | |
| 6,324,473 B1 | 11/2001 | Eschenbach | |
| 6,662,107 B2 | 12/2003 | Gronemeyer | |
| 7,117,417 B2 | 10/2006 | Sharpe et al. | |
| 7,292,185 B2 | 11/2007 | Whitehead et al. | |
| 7,312,747 B2 | 12/2007 | Vollath et al. | |
| 7,432,853 B2 | 10/2008 | Vollath | |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,576,690 B2 | 8/2009 | Vollath | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 | 7/2010 | Chen et al. | |
| 7,768,449 B2 | 8/2010 | Gaal et al. | |
| 7,868,820 B2 | 1/2011 | Kolb | |
| 7,961,143 B2 | 6/2011 | Dai et al. | |
| 7,982,667 B2 | 7/2011 | Vollath et al. | |
| 8,018,377 B2 | 9/2011 | Collins | |
| 8,035,552 B2 | 10/2011 | Dai et al. | |
| 8,130,143 B2 | 3/2012 | Liu et al. | |
| 8,237,609 B2 | 8/2012 | Talbot et al. | |
| 8,242,953 B2 | 8/2012 | Dai et al. | |
| 8,260,551 B2 | 9/2012 | Janky et al. | |
| 8,334,807 B2 | 12/2012 | Gaal et al. | |
| 8,368,590 B2 | 2/2013 | Vollath et al. | |
| 8,368,591 B2 | 2/2013 | Talbot et al. | |
| 8,400,351 B2 | 3/2013 | Talbot et al. | |
| 8,542,146 B2 | 9/2013 | Vollath | |
| 8,558,736 B2 | 10/2013 | Talbot et al. | |
| 8,587,475 B2 | 11/2013 | Leandro | |
| 8,614,642 B2 | 12/2013 | Talbot et al. | |
| 8,694,250 B2 | 4/2014 | Talbot et al. | |
| 8,704,708 B2 | 4/2014 | Vollath | |
| 8,704,709 B2 | 4/2014 | Vollath et al. | |
| 2003/0016147 A1 | 1/2003 | Evans | |
| 2003/0048218 A1 | 3/2003 | Milnes et al. | |
| 2005/0055160 A1 | 3/2005 | King | |
| 2005/0064878 A1 | 3/2005 | O'Meagher | |
| 2005/0101248 A1 | 5/2005 | Vollath | |
| 2007/0063894 A1 | 3/2007 | Yu | |
| 2007/0200753 A1 | 8/2007 | Fuchs et al. | |
| 2008/0036654 A1 | 2/2008 | Hansen et al. | |
| 2008/0192242 A1 | 8/2008 | Nichols | |
| 2008/0204312 A1* | 8/2008 | Euler | G01S 19/32 342/357.27 |
| 2008/0238768 A1 | 10/2008 | Nasworthy | |
| 2008/0258966 A1 | 10/2008 | Sugimoto et al. | |
| 2009/0027264 A1 | 1/2009 | Chen et al. | |
| 2009/0098880 A1 | 4/2009 | Lindquist | |
| 2009/0109090 A1 | 4/2009 | Vollath | |
| 2009/0135057 A1 | 5/2009 | Vollath et al. | |
| 2009/0140914 A1 | 6/2009 | Talbot et al. | |
| 2009/0179792 A1 | 7/2009 | Remondi | |
| 2009/0179793 A1 | 7/2009 | Remondi | |
| 2009/0184869 A1 | 7/2009 | Talbot et al. | |
| 2009/0224969 A1* | 9/2009 | Kolb | G01S 19/04 342/357.27 |
| 2009/0237298 A1 | 9/2009 | Vollath et al. | |
| 2009/0322600 A1 | 12/2009 | Whitehead et al. | |
| 2010/0033370 A1 | 2/2010 | Lopez et al. | |
| 2010/0141515 A1 | 6/2010 | Doucet et al. | |
| 2010/0156709 A1 | 6/2010 | Zhang et al. | |
| 2010/0177806 A1 | 7/2010 | Normark et al. | |
| 2010/0214162 A1 | 8/2010 | Talbot et al. | |
| 2010/0245168 A1 | 9/2010 | Rollet et al. | |
| 2010/0253575 A1 | 10/2010 | Vollath | |
| 2011/0122020 A1* | 5/2011 | Henkel | G01S 19/44 342/357.27 |
| 2011/0140958 A1* | 6/2011 | Henkel | G01S 19/04 342/357.27 |
| 2011/0140959 A1 | 6/2011 | Vollath | |
| 2011/0148698 A1 | 6/2011 | Vollath | |
| 2011/0156949 A1 | 6/2011 | Vollath et al. | |
| 2011/0187590 A1 | 8/2011 | Leandro | |
| 2011/0267228 A1 | 11/2011 | Talbot et al. | |
| 2011/0279314 A1 | 11/2011 | Talbot et al. | |
| 2011/0285587 A1 | 11/2011 | Vollath et al. | |
| 2012/0026038 A1 | 2/2012 | Vollath | |
| 2012/0092213 A1 | 4/2012 | Chen | |
| 2012/0119944 A1 | 5/2012 | Chen | |
| 2012/0154210 A1 | 6/2012 | Landau et al. | |
| 2012/0154214 A1 | 6/2012 | Leandro | |
| 2012/0154215 A1 | 6/2012 | Vollath et al. | |
| 2012/0162007 A1 | 6/2012 | Leandro et al. | |
| 2012/0163419 A1 | 6/2012 | Seeger | |
| 2012/0176271 A1* | 7/2012 | Dai | G01S 19/04 342/357.44 |
| 2012/0229332 A1 | 9/2012 | Vollath et al. | |
| 2012/0286991 A1 | 11/2012 | Chen et al. | |
| 2012/0293367 A1 | 11/2012 | Chen et al. | |
| 2012/0306694 A1 | 12/2012 | Chen et al. | |
| 2013/0044026 A1 | 2/2013 | Chen et al. | |
| 2013/0335266 A1 | 12/2013 | Vollath et al. | |
| 2014/0002300 A1 | 1/2014 | Leandro et al. | |
| 2014/0015712 A1 | 1/2014 | Leandro et al. | |
| 2014/0070992 A1* | 3/2014 | Hernandez-Pajares | G01S 19/44 342/357.395 |

FOREIGN PATENT DOCUMENTS

| | | |
|---|---|---|
| EP | 2 037 291 A1 | 3/2009 |
| WO | 03/038464 A2 | 5/2003 |
| WO | 2005/043186 A2 | 5/2005 |
| WO | 2007/082038 A1 | 7/2007 |
| WO | 2010/096159 A2 | 8/2010 |

OTHER PUBLICATIONS

International Search Report and Written Opinion of the International Searching Authority dated May 31, 2011 in International Application No. PCT/US2010/002564 (seven pages).

International Search Report and Written Opinion of the International Searching Authority dated May 30, 2011 in International Application No. PCT/US2010/002563 (six pages).

International Search Report and Written Opinion of the International Searching Authority dated May 26, 2011 in International Application No. PCT/US2010/002562 (six pages).

International Search Report and Written Opinion of the International Searching Authority dated May 31, 2011 in International Application No. PCT/US2010/002581 (six pages).

International Search Report and Written Opinion of the International Searching Authority dated Sep. 27, 2011 in International Application No. PCT/US2011/024733 (ten pages).

International Search Report and Written Opinion of the International Searching Authority dated Oct. 6, 2011 in International Application No. PCT/US2011/024743 (ten pages).

International Search Report and Written Opinion of the International Searching Authority dated Sep. 26, 2011 in International Application No. PCT/US2011/024763 (ten pages).

International Search Report and Written Opinion of the International Searching Authority dated Oct. 12, 2012 in International Application No. PCT/US2012/029694 (fourteen pages).

International Search Report and Written Opinion of the International Searching Authority dated Oct. 16, 2012 in International Application No. PCT/US2012/028670 (eight pages).

International Search Report and Written Opinion of the International Searching Authority dated Sep. 5, 2012 in International Application No. PCT/US2012/028671 (eight pages).

Banville, S., et al., "Satellite and Receiver Phase Bias Calibration for Undifferenced Ambiguity Resolution," Proceedings of the 2008 National Technical Meeting of The Institute of Navigation, San Diego, CA, Jan. 2008, pp. 711-719.

Bar-Sever, Y. et al., "A new model for GPS yaw attitude," Journal of Geodesy, vol. 70, No. 11, Nov. 1996, pp. 714-723 (abstract only).

(56) References Cited

OTHER PUBLICATIONS

Bierman, G., "Factorization Methods for Discrete Sequential Estimation," Academic Press, Inc., 1977, 129 pages.

Bisnath, S., et al., "Precise Orbit Determination of Low Earth Orbiters with GPS Point Positioning," Proceedings of the 2001 National Technical Meeting of the Institute of Navigation, Long Beach, CA, Jan. 2001, pp. 725-733.

Collins, P., "Isolating and Estimating Undifferenced GPS Integer Ambiguities," Proceedings of the 2008 National Technical Meeting of the Institute of Navigation, San Diego, CA, Jan. 2008, pp. 720-732.

Collins, P., et al., "Precise Point Positioning with Ambiguity Resolution using the Decoupled Clock Model," Proceedings of the 21st International Technical Meeting of the Satellite Division of the Institute of Navigation (ION GNSS 2008), Savannah, GA, Sep. 2008, pp. 1315-1322.

Collins, P., et al., "Accessing and Processing Real-Time GPS Corrections for Precise Point Positioning . . . Some User Considerations," Proceedings of the 18th International Technical Meeting of the Satellite Division of the Institute of Navigation (ION GNSS 2005), Long Beach, CA, Sep. 2005, pp. 1483-1491.

Gao, Y., et al., "A New Method for Carrier-Phase-Based Precise Point Positioning," Navigation, Journal of the Institute of Navigation, vol. 49, No. 2, Summer 2002, pp. 109-116.

"GNSS Solutions: Precise Point Positioning and Its Challenges, Aided-GNSS and Signal Tracking," Inside GNSS, Nov./Dec. 2006, pp. 16-21.

Gabor, M., et al., "Satellite-Satellite Single-Difference Phase Bias Calibration as Applied to Ambiguity Resolution," Navigation, Journal of the Institute of Navigation, vol. 49, No. 4, Winter 2002-2003, pp. 223-247.

Ge, M., et al., "Resolution of GPS carrier-phase ambiguities in Precise Point Positioning (PPP) with daily observations," Journal of Geodesy, Jul. 2008, vol. 82, Issue 7, pp. 389-399.

Hauschild, A., et al., "Real-time Clock Estimation for Precise Orbit Determination of LEO-Satellites," Proceedings of the 21st International Technical Meeting of the Satellite Division of the Institute of Navigation (ION GNSS 2008), Savannah, GA, Sep. 2008, pp. 581-589.

Heroux, P., et al., "GPS Precise Point Positioning Using IGS Orbit Products," Phys. Chem. Earth (A), vol. 26, No. 6-8. pp. 573-578, 2001.

Heroux, P., et al., "GPS Precise Point Positioning with a Difference," presented at Geomeatics '95, Ottawa, Ontario, Canada, Jun. 13-15, 1995, 11 pages.

Hutsell, S., "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.

IERS Conventions (2003), International Earth Rotation and Reference Systems Service, IERS Technical Note No. 32, 127 pages.

"IGS Product Table—updated for 2009," from http://igsch.jpl.nasa.gov/components/prods.html on Aug. 19, 2009, three pages.

Kouba, J., "A simplified yaw-attitude model for eclipsing GPS satellites," GPS Solutions, Jan. 2009, vol. 13, Issue 1, pp. 1-12.

Kouba, J., "A guide to using International GPS Service (IGS) Products," International GPS Service, Feb. 2003, 31 pages.

Kouba, J., et al., "Precise Point Positioning Using IGS Orbit and Clock Products," GPS Solutions, Oct. 2001, vol. 5, Issue 2, pp. 12-28.

Lapucha, D., et al., "Comparison of the Two Alternate Methods of Wide Area Carrier Phase Positioning," Proceedings of the 17th International Technical Meeting of the Satellite Division of the Institute of Navigation (ION GNSS 2004), Long Beach, CA, Sep. 2004, pp. 1864-1871.

Laurichesse, D., et al., "Real Time Zero-difference Ambiguities Fixing and Absolute RTK," Proceedings of the 2008 National Technical Meeting of the Institute of Navigation, San Diego, CA, Jan. 2008, pp. 747-755.

Laurichesse, D., et al., "Integer Ambiguity Resolution on Undifferenced GPS Phase Measurements and its Application to PPP," Proceedings of the 20th International Technical Meeting of the Satellite Division of the Institute of Navigation (ION GNSS 2007), Fort Worth, TX, Sep. 2007, pp. 839-848.

Leandro, R., et al., "Wide Area Based Precise Point Positioning," Proceedings of the 19th International Technical Meeting of the Satellite Division of the Institute of Navigation (ION GNSS 2006), Fort Worth, TX, Sep. 2006, pp. 2272-2278.

Leandro, R., et al., "UNB Neutral Atmosphere Models: Development and Performance," Proceedings of the 2006 National Technical Meeting of the Institute of Navigation, Monterey, CA, Jan. 2006, pp. 564-573.

Lo, S., et al., "GNSS Album: Images and Spectral Signature of the New GNSS Signals," Inside GNSS, May/Jun. 2006, pp. 46-56.

Melbourne, W., "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.

Mervart, L., et al., "Precise Point Positioning with Ambiguity Resolution in Real-Time," Proceedings of the 21st International Technical Meeting of the Satellite Division of the Institute of Navigation (ION GNSS 2008), Savannah, GA, Sep. 2008, pp. 397-405.

Mireault, Y., et al., "Online Precise Point Positioning," GPS World, Sep. 2008, pp. 59-64.

Niell, A., "Global mapping functions for the atmosphere delay at radio wavelengths," Journal of Geophysical Research, vol. 101, No. B2, pp. 3227-3246, Feb. 10, 1996.

Schaer, S., [IGSMAIL-287]: Monitoring (P1-C1) code biases, IGS Electronic Mail Message No. 2827,May 9, 2000, two pages.

Seeber, G., Satellite Geodesy, 2d. Ed., 2003, 4 pages.

Tetrault, P., et al., "CSRS-PPP: An Internet Service for GPS User Access to the Canadian Spatial Reference Frame," Geomatica, vol. 59, No. 1, 2005, pp. 17-28.

Van Dierendonck, A., et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.

Verhagen, S., "The GNSS integer ambiguities: estimation and validation" PhD dissertation, Delft University of Technology, Publications on Geodesy, vol. 58, Netherlands Geodetic Commission, Delft, 2005, 196 pages.

Wubbena, G., "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).

Zumberge, J., et al., "Precise point positioning for the efficient and robust analysis of GPS data from large networks," Journal of Geophysical Research: Solid Earth, vol. 102, Issue B3, pp. 5005-5017, Mar. 10, 1997.

Melbourne, W., "The case for ranging in GPS-based geodetic systems," Proceedings 1st International Symposium on Precise Positioning with the Global Positioning system, (1985) U.S. Department of Commerce, Rockville, Maryland, vol. 1, pp. 373-386.

Non-Final Office Action for U.S. Appl. No. 13/372,488 dated Apr. 15, 2015, 13 pages.

Komjathy, A. et al., "An Assessment of the Current WAAS Ionospheric Correction Algorithm in the South American Region," Presented at the ION GPS 2002 International Technical Meeting, Portland, OR Sep. 24-27, 11 pages.

Schunk, R. W., et al., "Global Assimilation of Ionospheric Measurements (GAIM)" Radio Science, vol. 39, RS1S02, 2004, 13 pages.

* cited by examiner

GNSS SIGNAL PROCESSING WITH IONOSPHERE MODEL FOR SYNTHETIC REFERENCE DATA

CROSS-REFERENCE TO RELATED APPLICATIONS

This application is a divisional of U.S. application Ser. No. 13/372,488, filed Feb. 13, 2012, which claims priority to U.S. application No. 61/442,680, filed Feb. 14, 2011, the entire contents of both of which are incorporated herein by reference in their entirety for all purposes.

RELATED APPLICATIONS

The following related applications are incorporated herein in their entirety by this reference:
International Publication Number WO 2011/034614 A2, published 24 Mar. 2011 (International Application Number PCT/US2010/002562 filed 19 Sep. 2010);
International Publication Number WO 2011/034615 A2, published 24 Mar. 2011 (International Application Number PCT/US2010/002563 filed 19 Sep. 2010);
International Publication Number WO 2011/034616 A2, published 24 Mar. 2011 (International Application Number PCT/US2010/002564 filed 19 Sep. 2010);
International Publication Number WO 2011/034617 A2, published 24 Mar. 2011 (International Application Number PCT/US2010/002565 filed 19 Sep. 2010);
International Publication Number WO 2011/034624 A2, published 24 Mar. 2011 (International Application Number PCT/US2010/002581 filed 19 Sep. 2010);
U.S. Provisional Application for Patent No. 61/277,184 filed 19 Sep. 2009;
Chinese Patent Publication No. CN 102 331 582 A, published 25 Jan. 2012 (Chinese Patent Application No. 2011 101 42 466.1 filed 30 May 2011);
German Patent Application No. 10 2011 076 602.2 filed 27 May 2011;
U.S. patent application Ser. No. 13/117,092 filed 26 May 2011;
U.S. Provisional Application for Patent No. 61/396,676 filed 30 Sep. 2010;
Chinese Patent Publication No. CN 102 331 583 A, published 25 Jan. 2012 (Chinese Patent Application No. 2011 101 42 268.5 filed 30 May 2011);
German Patent Application No. 10 2011 076 604.9 filed 27 May 2011;
U.S. patent application Ser. No. 13/117,111 filed 26 May 2011;
U.S. Provisional Application for Patent No. 61/442,680 filed 14 Feb. 2011;
International Publication Number WO 2011/100680 A2, published 18 Aug. 2011 (corrected publication WO 2011/100680 A9, International Application Number PCT/US2011/024743 filed 14 Feb. 2011, and
International Publication Number WO 2011/100690 A2, published 18 Aug. 2011 (International Application Number PCT/US2010/024763 filed 14 Feb. 2011.

BACKGROUND

Embodiments described in International Publication Number WO 2011/034614 A2 generate synthetic base station data which preserve the integer nature of carrier phase data. (See for example Part 11 and Parts 2, 7.2, 7.5, 7.8, 8.8, 9.6.4, 12.1, 12.2 and 12.6 of WO 2011/034614 A2.) A set of corrections is computed per satellite (a Melbourne-Wübbena bias, a code leveled clock error and a phase leveled clock error) from global network data. Using these corrections, a rover can use the Melbourne-Wübbena (MW) linear combination to solve widelane ambiguities and use ionospheric-free code/phase observations to solve the narrowlane ambiguities. With fixed ambiguities, the rover can achieve cm-level accuracy positioning in real-time.

An advantage of this approach is that it is insensitive to ionospheric activity, as no ionosphere information is required—all observation combinations used in the network and rover processes are ionospheric-free.

A disadvantage is that the convergence time is longer than desired, typically 10-15 minutes to attain 2-5 cm rover position accuracy, due to the lack of ionosphere information. Another disadvantage of this approach is that the generated synthetic data cannot be used for single-frequency data processing without modifying existing rover data processing software.

SUMMARY

Some embodiments of the present invention derive an ionospheric phase bias and an ionospheric differential code bias (DCB) using an absolute ionosphere model, which can for example be estimated from the network data (a described for example in Chinese Patent Publication No. CN 102 331 582 A, published 25 Jan. 2012; German Patent Application No. 10 2011 076 602.2 filed 27 May 2011; U.S. patent application Ser. No. 13/117,092 filed 26 May 2011; and U.S. Provisional Application for Patent No. 61/396,676 filed 30 Sep. 2010) or obtained from an external source such as WAAS (Wide-Area Augmentation System), GAIM (Global Assimilative Ionospheric Model), IONEX (IONosphere map EXchange) or other source.

Fully synthetic reference station data is generated using the ionospheric phase bias (obtained for example by the estimation explained below) and/or the ionospheric differential code bias (obtained for example by the estimation explained below) together with the phase leveled clock (obtained for example as explained in Part 9 of WO 2011/034614 A2) and ionospheric-free code bias (obtained for example as explained in Part 6 of WO 2011/034614 A2) and/or MW bias (obtained for example as explained in Part 7 of WO 2011/034614 A2).

DETAILED DESCRIPTION

Figure 1:
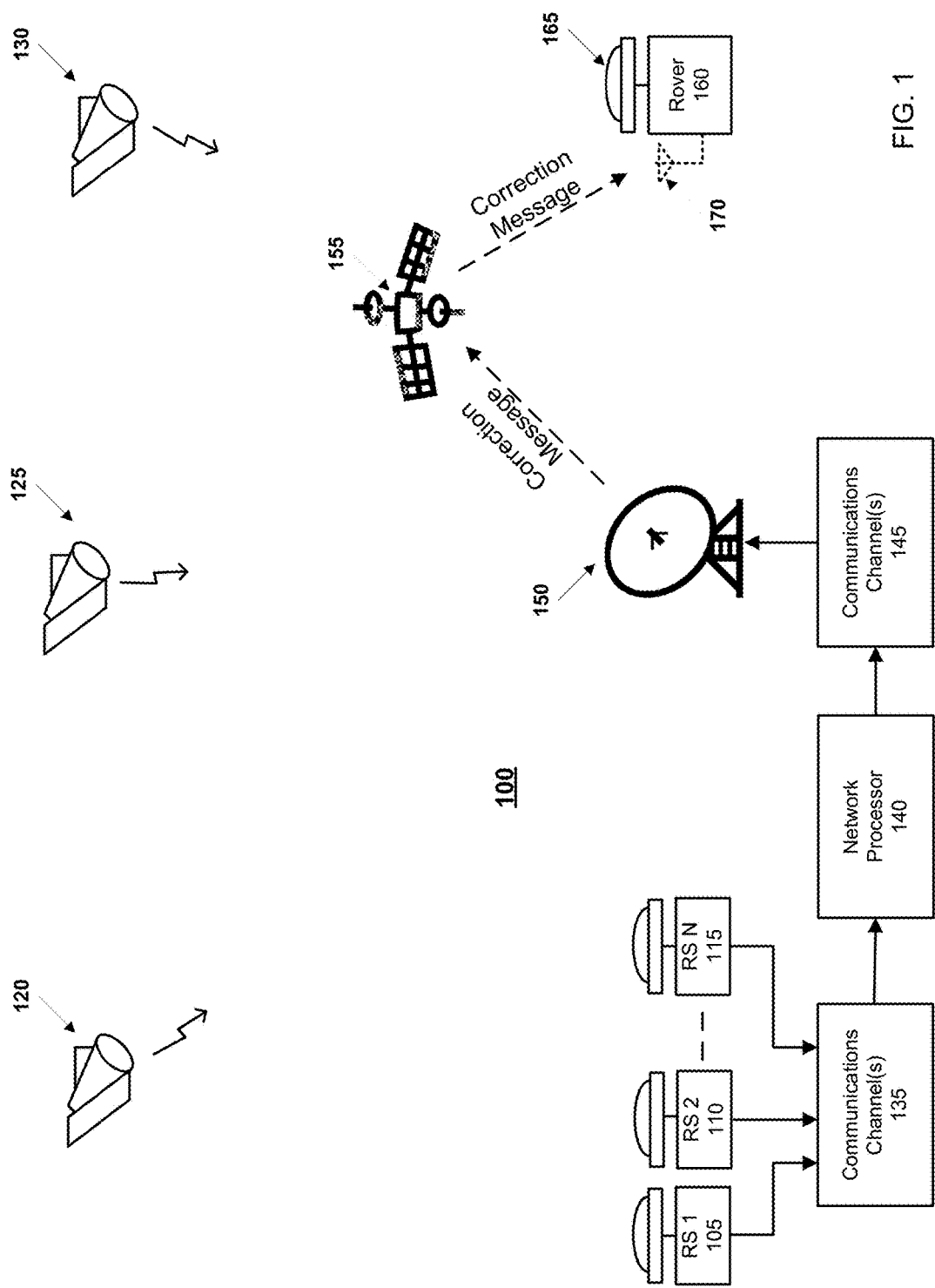
FIG. 1 shows a high level view of a system in accordance with some embodiments of the invention.

Estimate Ionospheric Differential Code Bias (DCB) and Ionospheric Phase Bias

The ionospheric differential code bias and the ionospheric phase bias are obtained in accordance with some embodiments of the invention by the estimation which will now be explained. GPS $L_1$ and $L_2$ carrier phase observations and code observations can be expressed as:

$$L_1 = \lambda_1 \varphi_1 = \rho + T + I_1 + c \cdot (t_r - t^s) + b_1^r - b_1^s + \lambda_1 N_1 + v_1 \quad (1)$$

$$L_2 = \lambda_2 \varphi_2 = \rho + T + \frac{\lambda_2^2}{\lambda_1^2} I_1 + c \cdot (t_r - t^s) + b_2^r - b_2^s + \lambda_2 N_2 + v_2 \quad (2)$$

$$P_1 = \rho + T - I_1 + c \cdot (t_r - t^s) + B_1^r - B_1^s + \varepsilon_1 \quad (3)$$

$$P_2 = \rho + T - \frac{\lambda_2^2}{\lambda_1^2} I_1 + c \cdot (t_r - t^s) + B_2^r - B_2^s + \varepsilon_2 \quad (4)$$

where $\lambda_1$ and $\lambda_2$ are the wavelengths of the $L_1$ and $L_2$ carriers, respectively, $L_1$ and $L_2$ are the $L_1$ and $L_2$ carrier phase observations in metric units, $\varphi_1$ and $\varphi_2$ are the $L_1$ and $L_2$ carrier phase observations in cycles, $\rho$ is the geometric range between antenna phase centers of satellite and receiver, T is the tropospheric delay, $I_1$ is the $L_1$ ionospheric delay, $t^s$ and $t_r$ are the satellite clock error and receiver clock error, respectively, $b_1^s$ and $b_2^s$ are the satellite $L_1$ phase bias and satellite $L_2$ phase bias, respectively, $b_1^r$ and $b_2^r$ are the receiver $L_1$ phase bias and satellite $L_2$ phase bias, respectively, $N_1$ and $N_2$ are "true" $L_1$ and $L_2$ integer ambiguities, respectively, $v_1$ and $v_2$ are phase noise plus multipath of $L_1$ and $L_2$, respectively, $P_1$ and $P_2$ are the $L_1$ and $L_2$ code observations in metric units, $B_1^s$ and $B_2^s$ are the satellite $L_1$ and $L_2$ code bias respectively, $B_1^r$ and $B_2^r$ are the receiver $L_1$ and $L_2$ code bias respectively, and $\varepsilon_1$ and $\varepsilon_2$ are the code noise plus multipath of $L_1$ and $L_2$, respectively.

Modeling equations and linear combinations of observations are discussed for example in Part 4 of WO 2011/034614 A2. The ionospheric phase observation $L_{I1}$ (mapped to frequency L1) can be written as:

$$L_{I1} = \frac{\lambda_1^2}{\lambda_1^2 - \lambda_2^2}(L_1 - L_2) = I_1 + b_I^r - b_I^s + N_I + v_I \quad (5)$$

where $$N_I = \frac{\lambda_1^3}{\lambda_1^2 - \lambda_2^2} N_1 - \frac{\lambda_1^2 \lambda_2}{\lambda_1^2 - \lambda_2^2} N_2 = -\frac{\lambda_1^3}{\lambda_2^2 - \lambda_1^2} N_w + \frac{\lambda_1^2}{\lambda_1 + \lambda_2} N_2 \quad (6)$$

is the ionospheric ambiguity, and $$b_I^r = \frac{\lambda_1^2}{\lambda_2^2 - \lambda_1^2}(b_2^r - b_1^r) \text{ and } b_I^s = \frac{\lambda_1^2}{\lambda_2^2 - \lambda_1^2}(b_2^s - b_1^s) \quad (7)$$

are respectively the receiver and satellite ionospheric phase biases, and $v_I$ is the phase noise plus multipath of the ionospheric phase observation. See Eq. 13 below for widelane ambiguity $N_w$.

The ionospheric code observation can be written as:

$$P_I = P_2 - P_1 = \frac{\lambda_1^2 - \lambda_2^2}{\lambda_1^2} I_1 + B_I^r - B_I^s + \varepsilon_I \quad (8)$$

where $$B_I^r = B_2^r - B_1^r \text{ and } B_I^s = B_2^s - B_1^s \quad (9)$$

are the receiver differential code bias and satellite ionospheric differential code bias (DCB) respectively, the ionospheric DCB is the differential code bias in ionospheric code observation as shown in Eq. (8), and $\varepsilon_I$ is the phase noise plus multipath of the ionospheric code observation.

With a known ionospheric model, the ionospheric delay $I_1$ can be computed. The ionospheric model may provide a total electron content (TEC) per receiver-satellite pairing. The relation between L1 ionospheric delay and Total Electron Content (TEC) is:

$$I_1 = 40.3 \frac{TEC}{f_1^2},$$

where $f_1$ is the L1 frequency, and $f_1^2$ denotes the square of $f_1$. Together with the fixed ambiguities derived from the network data, by using Eq. (5), the ionospheric phase bias can be estimated with Kalman filter or least square estimation. Optionally, ionospheric DCB can be estimated with Eq. (9). To avoid rank deficiency, one satellite bias can be set to zero, or use a zero mean constraint (the sum of all satellite biases equal to zero). (Note: The rank of an m×n matrix cannot be greater than m nor n. A matrix that has a rank as large as possible is said to have full rank; otherwise, the matrix is rank deficient.)

NOTE: the ambiguities used to derive ionospheric phase bias must be the same as the ones used to derive phase leveled clock error. Otherwise, the difference of the ambiguities must be applied to the calculated ionospheric phase bias.

Phase and Code Leveled Satellite Clock Error, and MW Bias

Phase leveled clock and code leveled clock are explained for example in Part 9 and Part 6 of WO 2011/034614 A2. Phase and code leveled clock are computed with ionospheric-free phase and code observations.

Ionospheric free phase observation can be written as:

$$L_{IF} = \rho + T + c \cdot (t_r - t^s) + b_c^r - b_c^s + N_c + v_c \quad (10)$$

where $$N_c = \frac{\lambda_1 \lambda_2^2}{\lambda_2^2 - \lambda_1^2} N_1 + \frac{\lambda_1^2 \lambda_2}{\lambda_2^2 - \lambda_1^2} N_2 = \frac{\lambda_1 \lambda_2^2}{\lambda_2^2 - \lambda_1^2} N_w + \frac{\lambda_1 \lambda_2}{\lambda_1 + \lambda_2} N_2 \quad (11)$$

is the ionospheric-free ambiguity, $$b_c^r = \frac{\lambda_2^2}{\lambda_2^2 - \lambda_1^2} b_1^r - \frac{\lambda_1^2}{\lambda_2^2 - \lambda_1^2} b_2^r \text{ and } b_c^s = \frac{\lambda_2^2}{\lambda_2^2 - \lambda_1^2} b_1^s - \frac{\lambda_1^2}{\lambda_2^2 - \lambda_1^2} b_2^s \quad (12)$$

are the receiver and satellite ionospheric-free satellite phase bias, and $$N_w = N_1 - N_2 \quad (13)$$

is the widelane ambiguity, and $v_c$ is the phase noise plus multipath of the ionospheric-free phase observation.

And the ionospheric-free code observation can be expressed as:

$$P_{IF} = \rho + T + c \cdot (t_r - t^s) + B_c^r - B_c^s + \varepsilon_c \quad (14)$$

where:

$$B_c^r = \frac{\lambda_2^2}{\lambda_2^2 - \lambda_1^2} B_1^r - \frac{\lambda_1^2}{\lambda_2^2 - \lambda_1^2} B_2^r \text{ and} \quad (15)$$

$$B_c^s = \frac{\lambda_2^2}{\lambda_2^2 - \lambda_1^2} B_1^s - \frac{\lambda_1^2}{\lambda_2^2 - \lambda_1^2} B_2^s$$

are the receiver and satellite ionospheric-free code bias respectively and $\varepsilon_c$ is the phase noise plus multipath of the ionospheric-free code observation.

With resolved network ambiguities, the phase leveled satellite clock error can be written as:

$$t_\varphi^s = c \cdot t^s + b_c^s \quad (16)$$

As only double difference ambiguity is unique and the undifferenced ambiguity is not unique, the phase leveled clock error expressed in Eq. (16) is not unique; it can be offset by a combination of integer L1, L2 ambiguities.

$$t_\varphi^s = c \cdot t^s + b_c^s + \Delta N_C \quad (16a)$$

where $\Delta N_C$ is a combination of L1, L2 ambiguities
And code leveled satellite clock error is:

$$t_P^s = c \cdot t^s + B_c^s \quad (17)$$

Discussion of the MW bias is found for example in Part 7 of WO 2011/034614 A2. The MW bias is a combination of phase, code leveled clock error, ionospheric phase bias and ionospheric DCB.

$$B_{WM}^s = b_{WL}^s - B_{NL}^s \quad (18)$$

$$= \frac{\lambda_2}{\lambda_2 - \lambda_1} b_1^s - \frac{\lambda_1}{\lambda_2 - \lambda_1} b_2^s - \left( \frac{\lambda_2}{\lambda_1 + \lambda_2} B_1 + \frac{\lambda_1}{\lambda_1 + \lambda_2} B_2 \right)$$

$$= t_P^s - t_\varphi^s + \frac{\lambda_2}{\lambda_1} b_1^s - \frac{\lambda_1 \lambda_2}{\lambda_2^2 - \lambda_1^2} B_1^s$$

Generate Fully Synthetic Code and Phase Observation
There are several ways to generate synthetic base station data:
1) As described for example in U.S. Provisional Application for Patent 61/277,184 filed 19 Sep. 2009, and in International Publication Number WO 2011/034614 A2, published 24 Mar. 2011.
2) Use code/phase leveled clock, ionospheric DCB, ionospheric phase bias and ionosphere model.
Generate ionospheric free phase and code observations with phase/code leveled satellite clock errors:

$$\hat{L} = \hat{\rho} + T_0 - t_\varphi^s \quad (19)$$

$$\hat{P}_{IF} = \hat{\rho} + T_0 - t_P^s \quad (20)$$

where
$\hat{\rho}$ is the computed geometric distance between the satellite and synthetic base station location,
$T_0$ is an a priori troposphere model, and
$\hat{L}_{IF}$ and $\hat{P}_{IF}$ are the generated ionospheric-free phase and code observations, respectively.
Generate L1, L2 phase observation $$\hat{L}_1 = \hat{L}_{IF} + I_1 - b_I^s \quad (21)$$

$$\hat{L}_2 = \hat{L}_{IF} + \frac{\lambda_2^2}{\lambda_1^2}(I_1 - b_I^s) \quad (22)$$

where $I_1$ is the ionospheric delay computed from ionosphere model, $b_1^s$ is the derived satellite ionospheric phase bias.
Generate L1, L2 code observation $$\hat{P}_1 = \hat{P}_{IF} + I_1 - \frac{\lambda_1^2}{\lambda_2^2 - \lambda_1^2} B_I^s \quad (23)$$

$$\hat{P}_2 = \hat{P}_{IF} - \frac{\lambda_2^2}{\lambda_1^2} I_1 - \frac{\lambda_2^2}{\lambda_2^2 - \lambda_1^2} B_I^s \quad (24)$$

3) Use code/phase leveled clock, MW bias, ionospheric phase bias and ionosphere model
The generation of L1, L2 phase observation is the same as method 2, Eq. (21), (22)

$$\hat{P}_1 = \hat{P}_{IF} - I_1 - \frac{\lambda_1}{\lambda_2}(t_P^s - t_\varphi^s) - b_I^s + \frac{\lambda_1}{\lambda_2} B_{MW}^s \quad (25)$$

$$\hat{P}_2 = \hat{P}_{IF} - \frac{\lambda_2^2}{\lambda_1^2} I_1 - \frac{\lambda_2}{\lambda_1}(t_P^s - t_\varphi^s) - \frac{\lambda_2^2}{\lambda_1^2} b_I^s + \frac{\lambda_2}{\lambda_1} B_{MW}^s \quad (26)$$

4) Use code/phase leveled clock, MW bias, DCB and ionosphere model
In this variant the ionospheric phase bias is not used. Thus the accuracy of the generated phase observations suffers to some extent from the fact that the bias term is given in code accuracy.
Generate L1, L2 phase observation $$\hat{L}_1 = \hat{L}_{IF} - I_1 + \frac{\lambda_1}{\lambda_2}(t_P^s - t_\varphi^s + B_{MW}^s) + \frac{\lambda_1^2}{\lambda_2^2 - \lambda_1^2} B_I^s \quad (27)$$

$$\tilde{L}_2 = \tilde{L}_{IF} - \frac{\lambda_2^2}{\lambda_1^2} I_1 + \frac{\lambda_2}{\lambda_1}(\tilde{t}_P^s - t_\phi^s + B_{MW}^s) + \frac{\lambda_2^2}{\lambda_2^2 - \lambda_1^2} B_I^s \quad (28)$$

The generation of L1, L2 code observation is the same as method 2, Eq. (23), (24)

Variants 2) and 3) allow to process single-frequency data with fixed ambiguities. Theoretically, Variant 4) allows to process single frequency with fixed ambiguity, but due to the accuracy of MW bias and ionospheric DCB, practically, Variant 4) is not used to fix ambiguity for single frequency data.

Fully synthetic base station data can be processed with rover observations in any real-time-kinematic (RTK) engine that can process single-frequency or multi-frequency data. Many RTK systems are multi-frequency, but there are single-frequency RTK systems that can work over very short baseline distance between base receiver and rover receiver. A main difference with single-frequency processing is in the handling of ionosphere—it is assumed that the baseline is short enough to almost cancel ionospheric effects. Multi-frequency RTK processing allows use of ionospheric-free combinations for position determination.

RTK performance is dependent on accuracy of the ionospheric information used to generate the synthetic base station data, e.g., the quality of the ionospheric model. Any model works, but a good model gives better results. A good model means that the ionospheric delay derived from the model is more accurate and can significantly decrease the convergence time of RTK solution.

In worst case, a multi-frequency system can ignore the ionospheric information and fall back to processing variant 1). Processing variants 2)-4) can be viewed as an augmentation of variant 1).

In some embodiments the ionospheric phase bias is transmitted from the network processor to the rover (such as by adding the ionospheric phase bias to the correction message described in U.S. Provisional Application for Patent 61/277, 184 filed 19 Sep. 2009, and in International Publication Number WO 2011/034614 A2, published 24 Mar. 2011).

In some embodiments the ionospheric phase bias is not transmitted from the network processor to the rover, and instead an ionospheric model (such as WAAS transmission) is obtained separately for processing of the rover observations. This approach is fully compatible with variant 1).

In some embodiments the ionospheric DCBs are transmitted to the rover instead of (or in addition to) the MW biases.

Variant 1) has (per satellite):
1. MW bias
2. phase-leveled clock error
3. ionospheric-free code bias An ionospheric model adds (per satellite):
4. ionospheric phase bias
5. ionospheric differential code bias (DCB)

In principle, ionospheric phase bias is needed, but linear dependence allows any of one of the five items 1.-5. to be derived from the other four. However, it is more accurate to have the ionospheric phase bias because it is derived from carrier fixed ambiguities with carrier phase data, thus keeps integer nature of carrier phase observations.

The ionospheric DCB is derived from pseudorange observation (or carrier-phase-smoothed (averaged over time) code observation) so is missing the fixed ambiguity nature. In some embodiments, items 1.-5. are used at the rover along with the ionospheric model used at the network processor. Items 1.-3. are used to generate ionospheric-free code and phase. The MW bias is used to generate narrowlane code.

Variant 1) uses three corrections, maintaining integer nature of ambiguity without ionospheric information. Adding items 4. and 5. allows to generate non-ionospheric-free synthetic observations for code and phase which can be broadcast (e.g., to a rover) and an ionospheric model added (e.g., at the rover).

Practically, it is preferable to use 2., 3., 4. and either 1. or 5., though in general any four of these five items will work:
 Option 1: Using 1., 2., 3.+add 4.+ionospheric model or
 Option 2: Using 2., 3., 4., 5.+ionospheric model Moreover it is possible to derive synthetic observation data without the ionospheric phase bias (4.):
 Option 3: Using 1., 2., 3.,+add 5.+ionospheric model The current IONEX model describes VTEC (Vertical Total Electron Content) in a map produced every 2 hours with an accuracy of 1~2 TECU (Total Electron Content Units). A real-time ionospheric model can be used instead.

FIG. 1 shows a high level view of a system 100 in accordance with some embodiments of the invention. Reference stations of a worldwide tracking network, such as reference stations 105, 110, . . . 115, are distributed about the Earth. The position of each reference station is known very precisely, e.g., within less than 2 cm. Each reference station is equipped with an antenna and tracks the GNSS signals transmitted by the satellites in view at that station, such as GNSS satellites 120, 125, . . . 130. The GNSS signals have codes modulated on each of two or more carrier frequencies.

GNSS data collected at the reference stations is transmitted via communications channels 135 to a network processor 140. Network processor 140 uses the GNSS data from the reference stations with other information to generate a correction message containing correction information as described herein. The correction message is transmitted for use by any number of GNSS rover receivers. The correction message is transmitted as shown in FIG. 1 via an uplink 150 and communications satellite 155 for broadcast over a wide area; any other suitable transmission medium may be used including but not limited to radio broadcast or mobile telephone link. Rover 160 is example of a GNSS rover receiver having a GNSS antenna 165 for receiving and tracking the signals of GNSS satellites in view at its location, and optionally having a communications antenna 170. Depending on the transmission band of the correction message, it can be received by rover 160 via GNSS antenna 165 or communications antenna 170.

Figure 2:
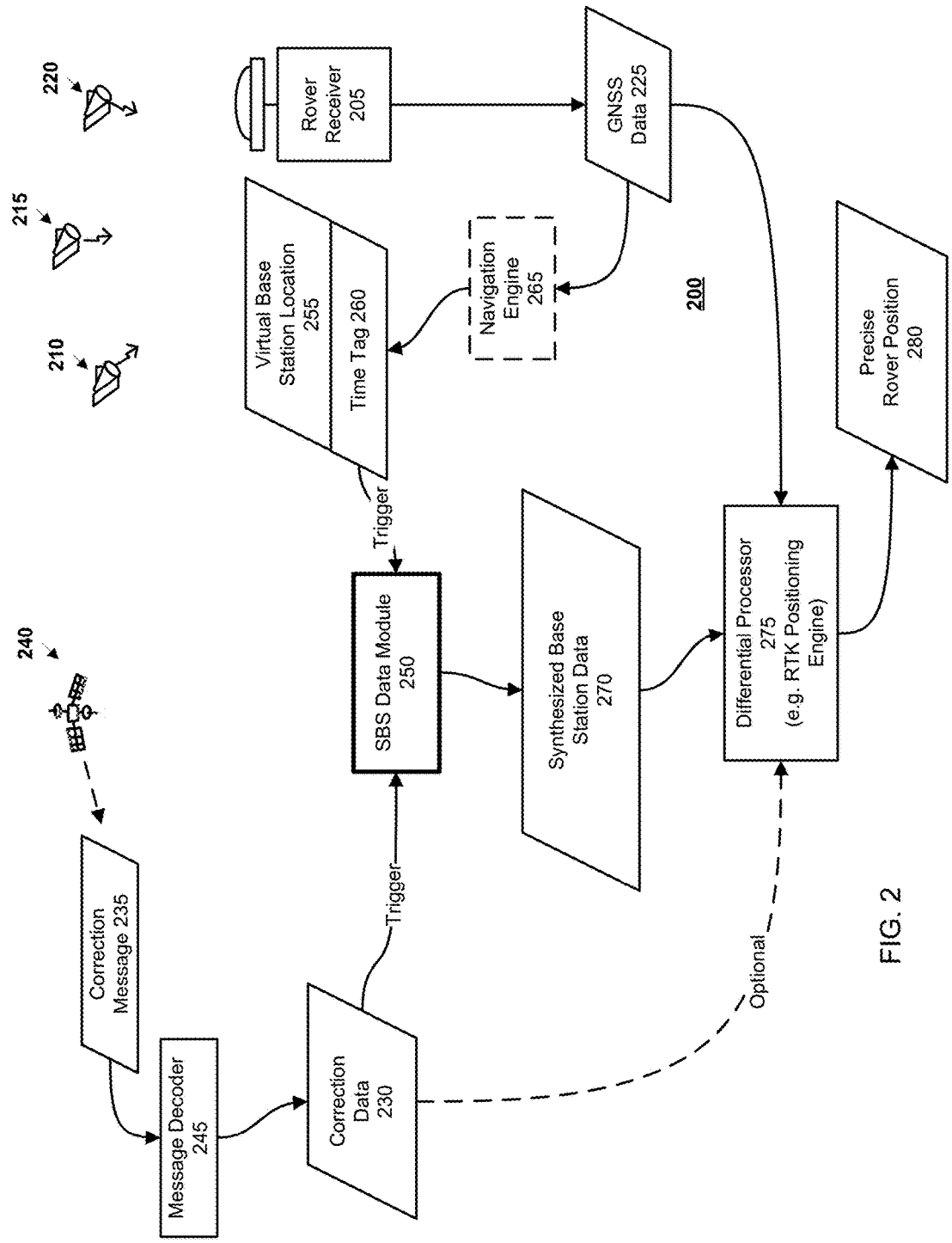
FIG. 2 shows an embodiment of synthetic base station (SBS) processing in accordance with some embodiments of the invention.

FIG. 2 shows an embodiment 200 of synthetic base station (SBS) processing in accordance with some embodiments of the invention. Rover receiver 205 receives GNSS signals from multiple GNSS satellites, of which three are shown at 210, 215 and 220. Receiver 205 derives GNSS data 225 from code observations and carrier-phase observations of the GNSS signals over multiple epochs.

Correction data 230 for the GNSS satellites are received, such as via a correction message 235 broadcast by a communications satellite 240 or by other means, and decoded by a message decoder 245. An SBS data module 250 receives the correction data 230 and also receives information which it can use as a virtual base location, such as an approximate rover position 255 with time tag 260 generated by an optional navigation processor 265. The approximate rover position is optionally obtained from other sources as described for example in Part 11 of International Publication Number WO 2011/034614 A2.

SBS data module 250 uses the correction data 230 and the approximate rover position 255 with time tag 260 to synthesize base station data 270 for the virtual base location. The SBS data module 250 is triggered by an event or arrival of information which indicates that a new epoch of synthesized base station data is to be generated, as described for example in Part 11 of International Publication Number WO 2011/034614 A2.

In some embodiments a differential processor 275, such as a typical RTK positioning engine of an integrated GNSS receiver system 400, receives the correction data 230, the synthesized base station data 270, and the GNSS data 225 of rover receiver 205, and uses these to determine a precise rover position 280. Synthesized base station data 270 is substituted for base station data in such processing.

Figure 3:
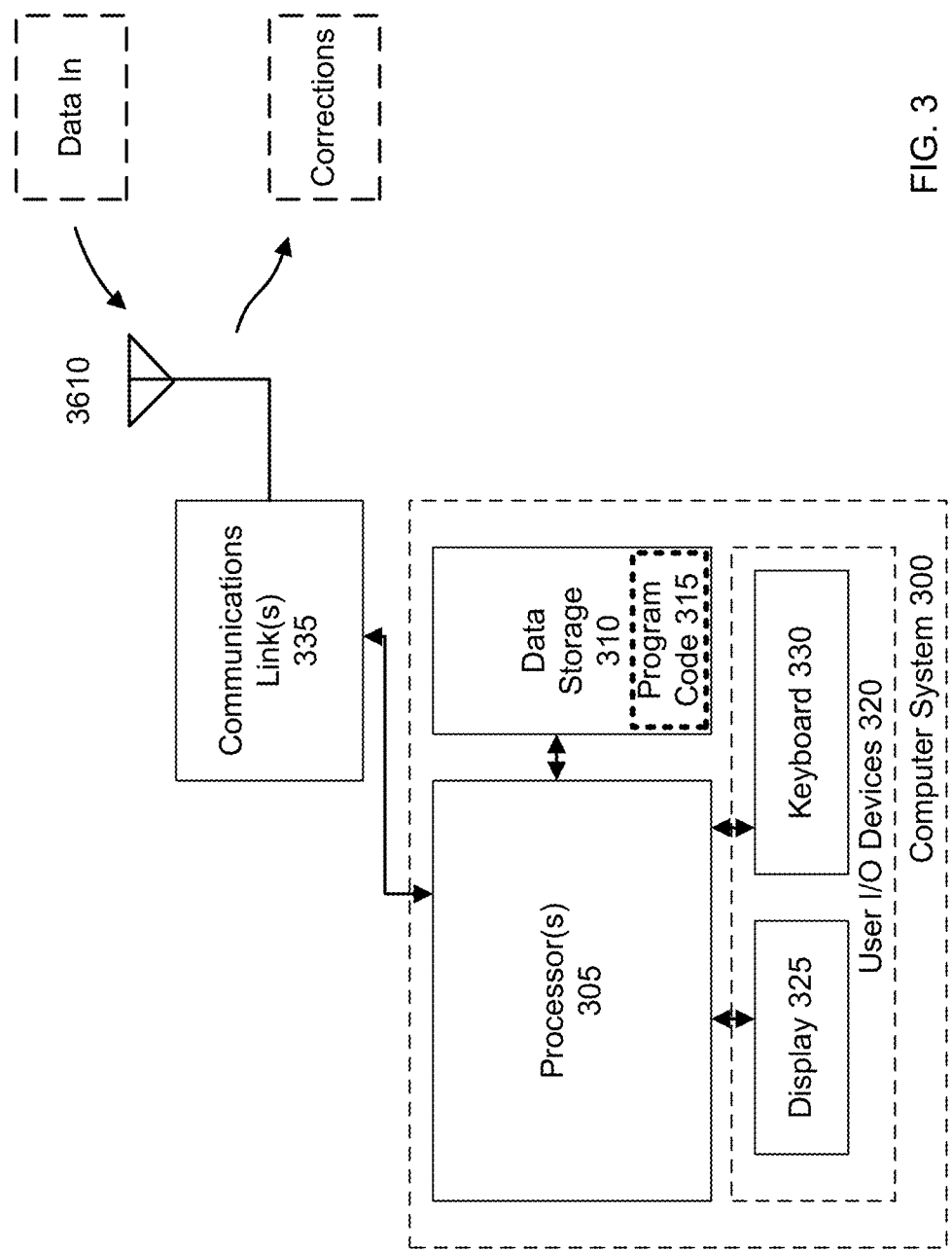
FIG. 3 is a schematic diagram of a network processor computer system in accordance with some embodiments of the invention.

FIG. 3 is a schematic diagram of a network processor computer system 300 in accordance with some embodiments of the invention. Computer system 300 includes one or more processors 305, one or more data storage elements 310, program code 315 with instructions for controlling the processor(s) 305, and user input/output devices 320 which may include one or more output devices such as a display 325 or speaker or printer and one or more devices for receiving user input such as a keyboard 330 or touch pad or mouse or microphone. Computer system 300 may also have one or more communications links 335 for exchanging data with other systems, e.g., via internet and/or other channels.

Figure 4:
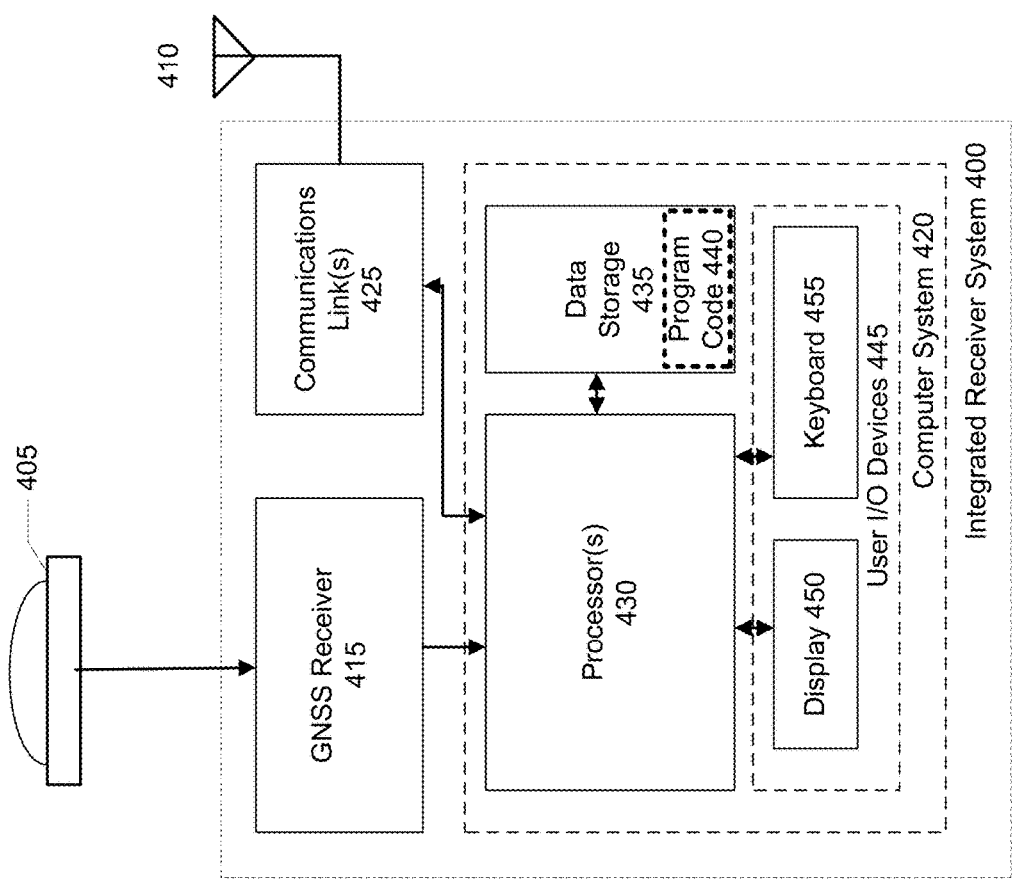
FIG. 4 is a simplified schematic diagram of an integrated GNSS receiver system in accordance with some embodiments of the invention.

FIG. 4 is a simplified schematic diagram of an integrated GNSS receiver system 400 in accordance with some embodiments of the invention, having a GNSS antenna 405 and communications antenna 410. The Trimble R8 GNSS System available from Trimble Navigation Limited of Sunnyvale, Calif. USA is an example of such a system. Receiver system 400 can serve as a network reference station. Receiver system 400 includes a GNSS receiver 415, a computer system 420 and one or more communications links 425. Computer system 420 includes one or more processors 430, one or more data storage elements 435, program code 440 with instructions for controlling the processor(s) 430, and user input/output devices 445 which may include one or more output devices such as a display 450 or speaker or printer and one or more devices for receiving user input such as a keyboard 455 or touch pad or mouse or microphone.

Figure 5:
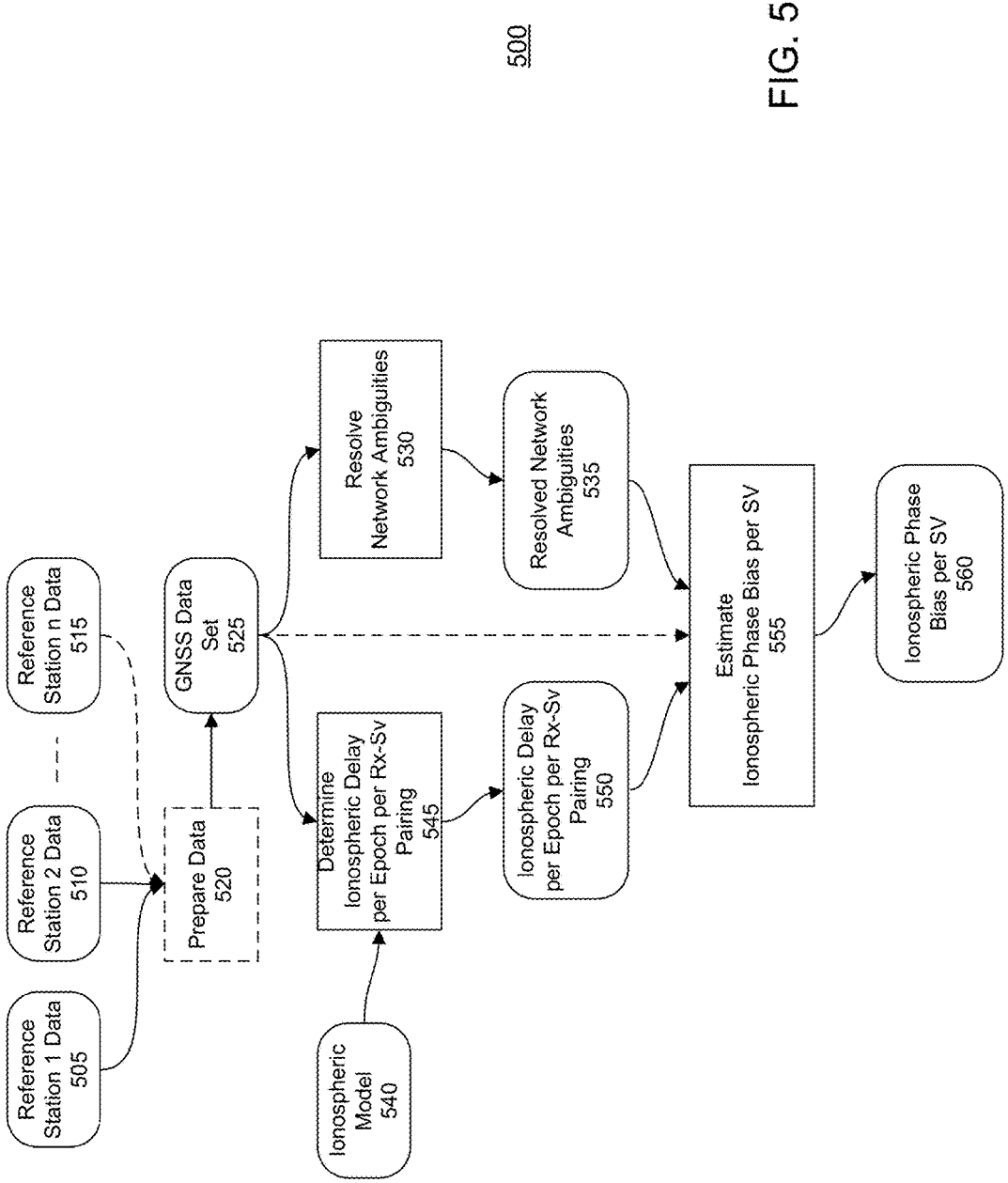
FIG. 5 shows a process in accordance with some embodiments of the invention.

FIG. 5 shows a process in accordance with some embodiments of the invention. Reference station data sets 505, 510, . . . 515 are obtained from respective reference stations. The data are optionally prepared at 520 (for example, steps such as differencing of observations, forming observation combinations and the like can be performed before estimation rather than within the estimation process if desired as known in the art). The result is a GNSS data set 525 derived from observations at the multiple reference stations. The GNSS data set 525 is used in a process 530 to resolve network ambiguities, thereby obtaining resolved network ambiguities 535 (see for example Part 7 of WO 2011/034614 A2). An ionospheric model 540 is used in a process 545 to determine ionospheric delays 550 comprising an ionospheric delay per epoch per receiver satellite pairing. A process 555 uses the resolved network ambiguities 535 and the ionospheric delays 550 to estimate an ionospheric phase bias per satellite comprising ionospheric phase biases 560.

Figure 6:
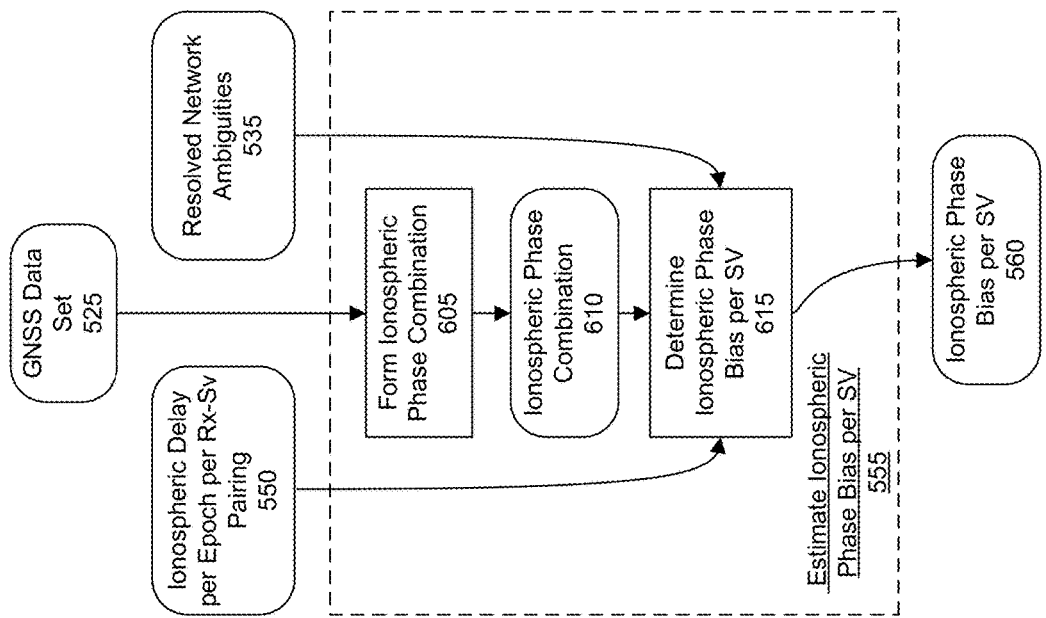
FIG. 6 shows an embodiment of a portion of the process of FIG. 5.

FIG. 6 shows at 600 an embodiment of the process 555. In this embodiment, a process 605 forms an ionospheric phase combination per satellite to obtain ionospheric phase combinations 610. A process 615 determines the ionospheric phase biases 560 as a combination of the ionospheric phase combination and the ionospheric delay and the resolved network ambiguities. See for example Equations (1)-(9) above.

Figure 7:
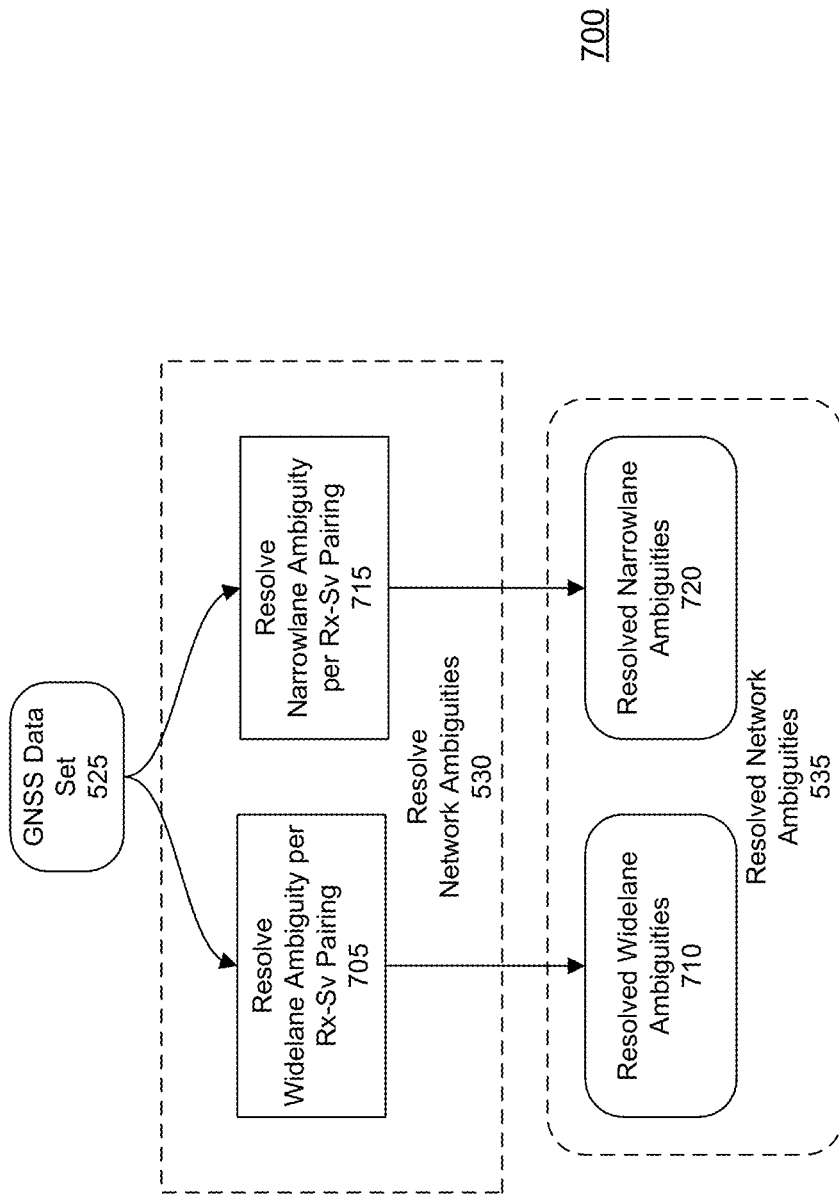
FIG. 7 shows an embodiment of a portion of the process of FIG. 5.

FIG. 7 shows at 700 an embodiment of the process 530 which resolves network ambiguities. In this embodiment, a process 705 resolves a widelane ambiguity for each receiver-satellite pairing, to thereby obtain resolved widelane ambiguities 710, and a process 715 resolves a narrowlane ambiguity for each receiver-satellite pairing, to thereby obtain resolved narrowlane ambiguities 720. The resolved network ambiguities 535 comprise the resolved widelane ambiguities 710 and the resolved narrowlane ambiguities 720. See for example Equations (10)-(18) above.

Figure 8:
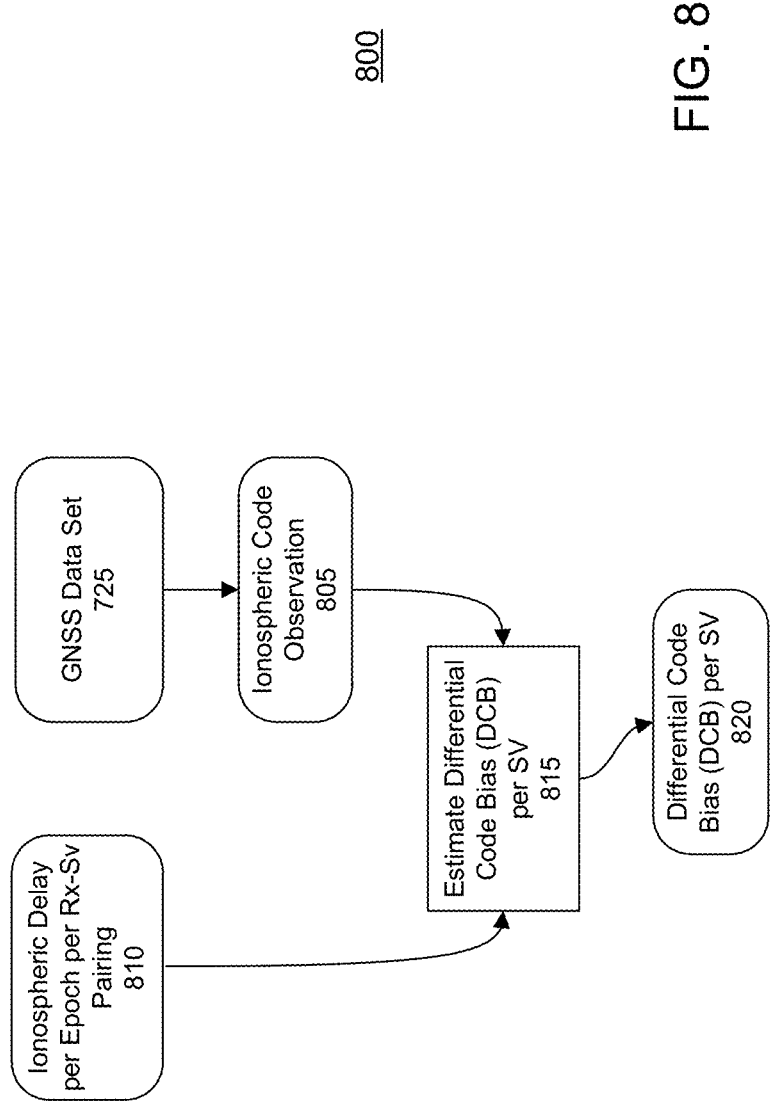
FIG. 8 shows at a process for obtaining a differential code bias per satellite in accordance with some embodiments of the invention.

FIG. 8 shows at 800 a process for obtaining a differential code bias per satellite in accordance with some embodiments of the invention. The ionospheric code observation 805 and the ionospheric delay per satellite-receiver pair 810 are used in a process 815 to estimate the differential code biases 820. See for example Equations (1)-(9) above.

Figure 9:
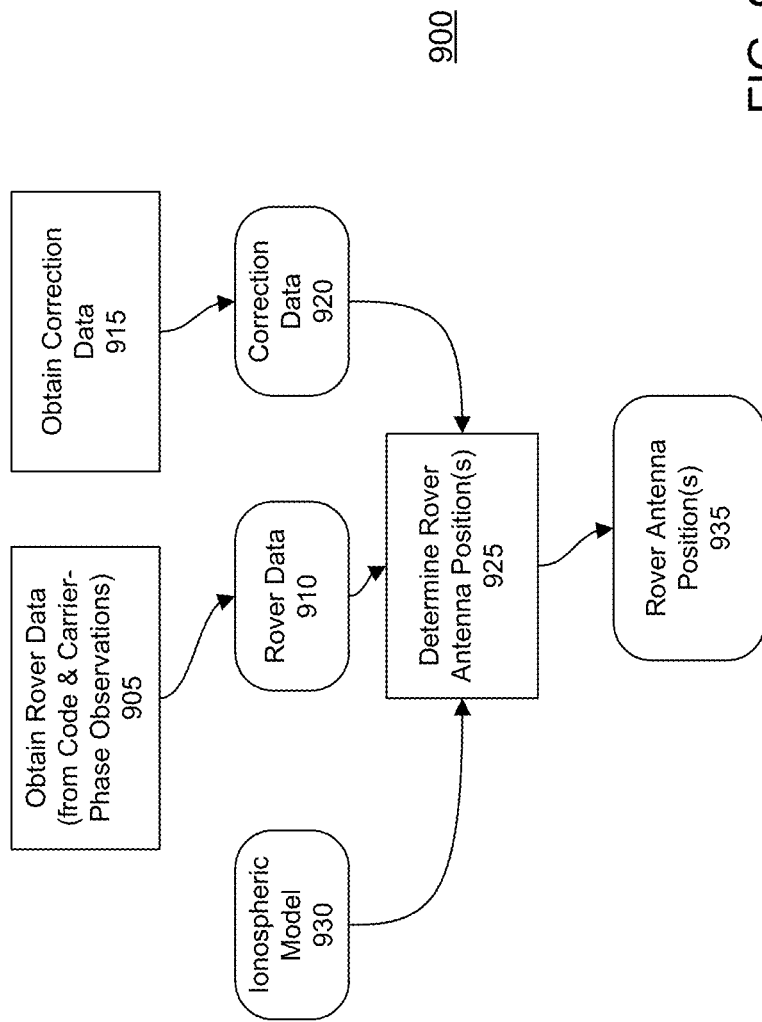
FIG. 9 shows a process for determining one or more rover positions in accordance with some embodiments of the invention.

FIG. 9 shows at 900 a process for determining one or more rover positions. Step 905 obtains rover data 910 which is derived from code observations and carrier observations of GNSS signals of multiple satellites over multiple epochs. Step 915 obtains correction data 920. Step 925 uses the rover data 910 and the correction data 920 and an ionospheric model 930 to determine one or more rover positions. See for example Part 11 of International Publication Number WO 2011/034614 A2.

In some embodiments the correction data 920 comprise (i) an ionospheric phase bias per satellite, (ii) information from which a code-leveled clock error per satellite and a phase-leveled clock error per satellite is derivable, and at least one of (iii) a MW bias per satellite and (iv) an ionospheric differential code bias per satellite.

In some embodiments the correction data comprise (i) a MW bias per satellite, (ii) information from which a code leveled clock error per satellite and a phase leveled clock error per satellite are derivable, (iv) an ionospheric differential code bias per satellite, and (iv) information defining the ionospheric model.

Figure 10:
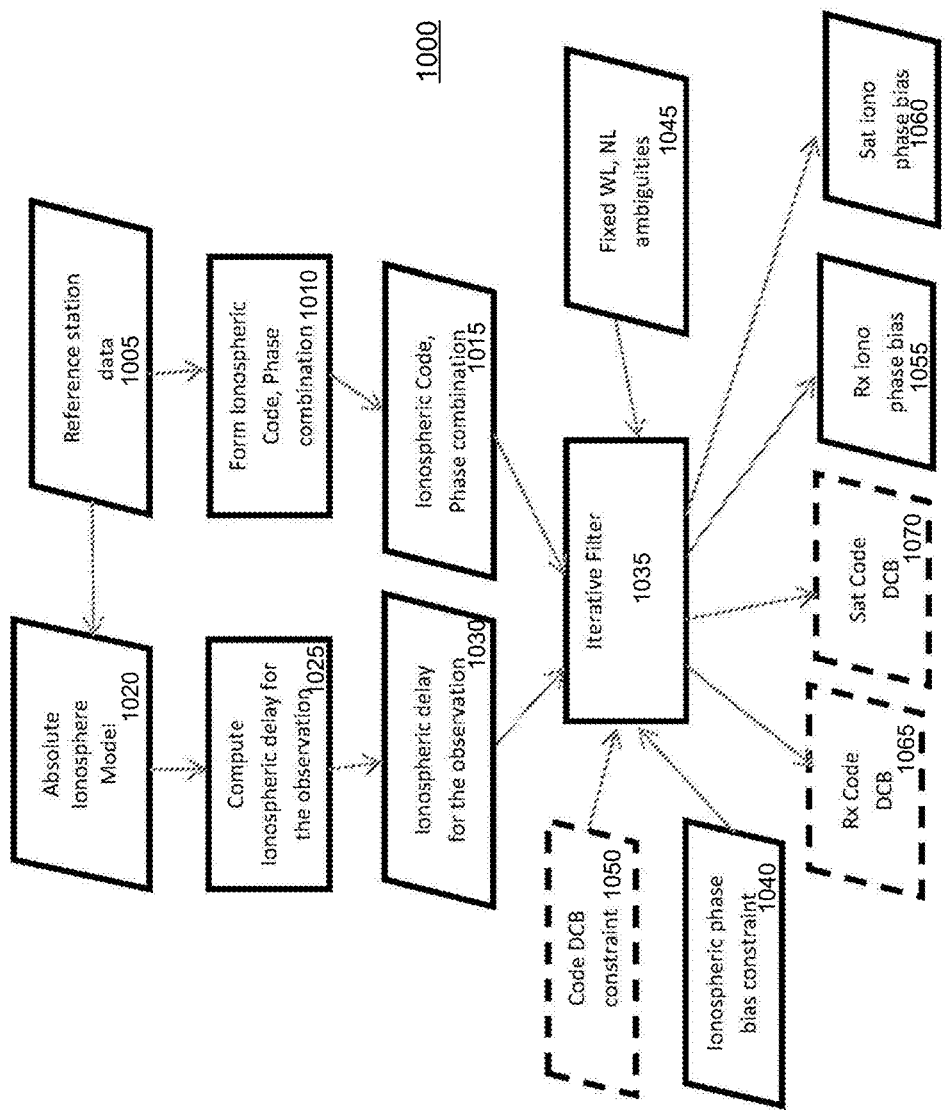
FIG. 10 shows a filtering arrangement for carrying out methods in accordance with some embodiments of the invention.

FIG. 10 shows at 1000 a filtering arrangement for carrying out methods in accordance with some embodiments of the invention. Reference station data 1005 are used by process 1010 to form ionospheric code, phase combination 1015. An absolute ionosphere model 1020 is derived from reference station data 1005 or obtained from an external source. The absolute ionosphere model 1020 is used at 1025 to compute an ionospheric delay 1030 for the observation. An iterative filter 1035 (such as a Kalman filter or resursive least-squares filter) processes data over multiple epochs, using the ionospheric delays 1030, the ionospheric code-phase combinations 1015, a ionospheric phase bias constraint 1040, fixed (widelane and narrow lane) ambiguities 1045 and (optionally) a ionospheric DCB constraint 1050, to estimate a receiver ionospheric phase bias 1055, a satellite ionospheric phase bias 1060, (optionally) an ionospheric receiver DCB 1065, and (optionally) an ionospheric satellite DCB 1070.

Summary of Inventive Concepts

1. [Estimating ionospheric phase biases] A method of processing a set of GNSS signal data derived from code observations and carrier-phase observations at multiple receivers of GNSS signals of multiple satellites over multiple epochs, the GNSS signals having at least two carrier frequencies, comprising:

a. resolving a set of network ambiguities,
b. determining from an ionospheric model an ionospheric delay per epoch per receiver-satellite pairing, and
c. using the network ambiguities and the ionospheric delays to estimate an ionospheric phase bias per satellite.

2. The method of 1, wherein estimating an ionospheric phase bias comprises, per satellite-receiver pair, forming an ionospheric phase combination and determining the ionospheric phase bias as a combination of the ionospheric phase combination and the ionospheric delay and the resolved network ambiguities.

3. The method of one of 1-2, wherein resolving a set of network ambiguities comprises resolving at least a widelane ambiguity per receiver-satellite pairing and a narrowlane ambiguity per receiver-satellite pairing.

4. The method of one of 1-3, wherein estimating an ionospheric phase bias per satellite comprises applying an ionospheric phase bias constraint.

5. The method of one of 1-4, further comprising estimating an ionospheric differential code bias (DCB) per satellite using the ionospheric code observation and the ionospheric delay per satellite-receiver pair.

6. The method of one of 1-5, wherein estimating an ionospheric DCB per satellite comprises applying a differential code bias (DCB) constraint.

7. The method of one of 1-6, further comprising transmitting data representing the ionospheric model.

8. The method of 7, wherein the data representing the ionospheric model comprises at least one of (i) a tag identifying a model, and (ii) parameters from which the ionospheric model can be reconstructed.

9. The method of one of 1-8, further comprising transmitting for use by a rover: the ionospheric phase bias per satellite, information from which a code leveled clock error per satellite and a phase leveled clock error per satellite is derivable, and at least one of (a) a MW bias per satellite and (b) an ionospheric differential code bias per satellite.

10. The method of 9, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

11. The method of one of 1-8, further comprising transmitting for use by a rover: a MW bias per satellite, information from which a code leveled clock error per satellite and a phase leveled clock error per satellite is derivable, an ionospheric differential code bias per satellite, and information defining an ionospheric model.

12. The method of 11, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

13. The method of one of 1-12 wherein the ionospheric model comprises one of: real-time ionosphere model estimated with global network data, WAAS, GAIM, IONEX, etc.

14. The method of one of 1-13, wherein resolving a set of network ambiguities comprises using a set of ambiguities estimated while generating a phase-leveled clock error per satellite.

15. The method of one of 1-14, wherein resolving a set of network ambiguities comprises using a MW combination to determine widelane ambiguities and ionospheric-free phase ambiguities to derive at least one of a L1 ambiguity and a L2 ambiguity.

16. The method of one of 1-15, wherein the set of network ambiguities comprises ambiguities which are unique and correct in double-difference.

17. The method of one of 1-16, wherein resolving a set of network ambiguities comprises using one of: (i) L1 ambiguities and L2 ambiguities, and (ii) any combination of L1 ambiguities and L2 ambiguities from which L1 ambiguities and L2 ambiguities can be derived.

18. The method of one of 1-17, wherein resolving a set of network ambiguities comprises determining a fixed integer value for each network ambiguity of the set.

19. A computer program product comprising instructions configured, when executed on a computer processing unit, to carry out a method according to one of 1-18.

20. A computer-readable medium on which is embodied a computer program product according to 19. 21. Apparatus configured to perform a method according to one of 1-18.

22. [Using iono phase biases in rover processing] A method of determining position of a rover antenna, comprising:
a. obtaining rover data derived from code observations and carrier phase observations of GNSS signals of multiple satellites over multiple epochs,
b. obtaining correction data comprising (i) an ionospheric phase bias per satellite, (ii) information from which a code leveled clock error per satellite and a phase leveled clock error per satellite is derivable, and at least one of (iii) a MW bias per satellite and (iv) an ionospheric differential code bias per satellite, and
c. using the rover data and the correction data and an ionospheric model to determine at least rover antenna positions.

23. [determining iono] The method of 22, wherein using the rover data and the correction data and an ionospheric model to determine at least rover antenna positions comprises using the ionospheric model to determine an ionospheric delay per satellite applicable to a region in which the rover antenna is located.

24. [SBS+iono] The method of one of 22-23, wherein using the rover data and the correction data and an ionospheric model to determine at least rover antenna positions comprises: determining a virtual base station location, and using the correction data to generate epochs of synthesized base station data.

25. The method of 24, wherein using the correction data to generate epochs of synthesized base station data comprises using a code leveled clock and a phase leveled clock and precise satellite orbit information to determine ionospheric-free code and phase observations for the virtual base station location, and combining the ionospheric-free code and phase observations for the virtual base station location with the ionospheric phase bias and an ionospheric delay derived from the ionospheric model to generate L1 & L2 phase observations.

26. The method of 25, further comprising combining a differential code bias and the ionospheric delay and the ionospheric-free code combination to generate L1 and L2 code observations.
27. The method of 25, further comprising combining a MW bias, the ionospheric delay, a difference between a code leveled clock error and phase leveled clock error, and the ionospheric-free code combination to generate L1 & L2 code observations.
28. A computer program product comprising instructions configured, when executed on a computer processing unit, to carry out a method according to one of 22-27.
29. A computer-readable medium on which is embodied a computer program product according to 28.
30. Apparatus configured to perform a method according to one of 22-28.
31. [Rover processing without iono phase biases] A method of determining position of a rover antenna, comprising:
  a. obtaining rover data derived from code observations and carrier phase observations of GNSS signals of multiple satellites over multiple epochs,
  b. obtaining correction data comprising a MW bias per satellite, information from which a code leveled clock error per satellite and a phase leveled clock error per satellite is derivable, an ionospheric differential code bias per satellite, and information defining an ionospheric model, and
  c. using the rover data and the correction data and the ionospheric model to determine at least rover antenna positions.
32. [determining iono] The method of 31, wherein using the rover data and the correction data and the ionospheric model to determine at least rover antenna positions comprises using the ionospheric model to determine an ionospheric delay per satellite applicable to a region in which the rover antenna is located.
33. [SBS+iono] The method of one of 31-32, wherein using the rover data and the correction data and the ionospheric model to determine at least rover antenna positions comprises: determining a virtual base station location, and using the correction data to generate epochs of synthesized base station data.
34. The method of 33, wherein using the correction data to generate epochs of synthesized base station data comprises using a code leveled clock and a phase leveled clock and precise satellite orbit information to determine ionospheric-free code and phase observations for the virtual base station location, and combining the ionospheric-free code and phase observations for the virtual base station location with the MW bias per satellite and the ionospheric differential code bias per satellite and an ionospheric delay derived from the ionospheric model to generate L1 & L2 phase observations.
35. The method of 34, further comprising combining the ionospheric differential code bias per satellite, MW bias per satellite and the ionospheric delay and the ionospheric-free code combination to generate L1 and L2 code observations.
36. A computer program product comprising instructions configured, when executed on a computer processing unit, to carry out a method according to one of 31-35.
37. A computer-readable medium on which is embodied a computer program product according to 36.
38. Apparatus configured to perform a method according to one of 31-36.

Those of ordinary skill in the art will realize that the detailed description of embodiments of the present invention is illustrative only and is not intended to be in any way limiting. The scope of the invention is intended to be defined by the claims given below.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Global Navigation Satellite Systems (GNSS) include the Global Positioning System (GPS), the Glonass system, the Galileo system, the proposed Compass system, and others. Each GPS satellite transmits continuously using at least two radio frequencies in the L-band, referred to as L1 and L2. Some GPS satellites also transmit on one or more further radio frequencies in the L-band. Each GNSS likewise has satellites which transmit multiple signals on multiple carrier frequencies. Embodiments of the present invention are not limited to any specific GNSS, or to L1 and L2 frequencies.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as a version of Microsoft® Windows® available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

The constituent parts of a unit may be distributed in different software or hardware components or devices for bringing about the intended function. Furthermore, the units may be gathered together for performing their functions by means of a combined, single unit. For instance, a receiver, a filter and a processing element may be combined to form a single unit, to perform the combined functionalities of the units.

The invention claimed is:

1. A method of global navigation satellite systems (GNSS) signal processing, the method comprising:
    receiving, at each of a plurality of reference station receivers, code observations and carrier phase observations of GNSS signals from multiple satellites over multiple epochs, the GNSS signals having at least two carrier frequencies;
    resolving a set of network ambiguities by resolving at least a widelane ambiguity per receiver-satellite pairing and a narrowlane ambiguity per receiver-satellite pairing;
    determining an ionospheric delay per epoch per receiver-satellite pairing based on a total electron content (TEC) per receiver-satellite pairing provided by an ionospheric model;
    estimating an ionospheric phase bias per satellite using ionospheric phase combinations of the carrier phase observations, the set of resolved network ambiguities, and the ionospheric delay per epoch per receiver-satellite pairing determined from the ionospheric model; and
    transmitting the ionospheric phase bias to a rover for determining a position of the rover.

2. The method of claim 1, wherein estimating the ionospheric phase bias per satellite comprises applying an ionospheric phase bias constraint.

3. The method of claim 1, further comprising estimating an ionospheric differential code bias (DCB) per satellite using an ionospheric code observation and the ionospheric delay per epoch per receiver-satellite pairing.

4. The method of claim 3, wherein estimating the ionospheric DCB per satellite comprises applying a differential code bias (DCB) constraint.

5. The method of claim 1, further comprising transmitting data representing the ionospheric model to the rover.

6. The method of claim 5, wherein the data representing the ionospheric model comprises at least one of (i) a tag identifying a model, and (ii) parameters from which the ionospheric model can be reconstructed.

7. The method of claim 1, further comprising transmitting to the rover: information from which a code leveled clock error per satellite and a phase leveled clock error per satellite is derivable, and at least one of (a) a Melbourne-Wübbena (MW) bias per satellite and (b) an ionospheric differential code bias per satellite.

8. The method of claim 7, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

9. The method of claim 1, further comprising transmitting to the rover: a Melbourne-Wübbena (MW) bias per satellite, information from which a code leveled clock error per satellite and a phase leveled clock error per satellite is derivable, an ionospheric differential code bias per satellite, and information defining the ionospheric model.

10. The method of claim 9, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

11. The method of claim 1, wherein the ionospheric model is estimated with global network data, or obtained from Wide-Area Augmentation System (WAAS), Global Assimilative Ionospheric Model (GAIM), or IONosphere map EXchange (IONEX).

12. The method of claim 1, wherein resolving the set of network ambiguities comprises using a set of ambiguities estimated while generating a phase-leveled clock error per satellite.

13. The method of claim 1, wherein the set of network ambiguities comprises ambiguities which are unique and correct in double-difference.

14. The method of claim 1, wherein resolving the set of network ambiguities comprises determining a fixed integer value for each of the set of network ambiguities.

15. A non-transitory tangible computer-readable medium on which is embodied a computer program product comprising instructions configured, when executed on a computer processing unit, to carry out the method of claim 1.

16. Apparatus for processing global navigation satellite systems (GNSS) signal data comprising code observations and carrier-phase observations of GNSS signals received at multiple GNSS receivers from multiple satellites over multiple epochs, the GNSS signals having at least two carrier frequencies, the apparatus comprising a processor, a transmitter, and a memory storing a set of instructions when executed by the processor enabling the processor to:
    resolve a set of network ambiguities by resolving at least a widelane ambiguity per receiver-satellite pairing and a narrowlane ambiguity per receiver-satellite pairing;
    determine an ionospheric delay per epoch per receiver-satellite pairing based on a total electron content (TEC) per receiver-satellite pairing provided by an ionospheric model;

estimate an ionospheric phase bias per satellite using ionospheric phase combinations of the carrier phase observations, the set of resolved network ambiguities, and the ionospheric delay per epoch per receiver-satellite pairing determined from the ionospheric model; and cause the transmitter to transmit the ionospheric phase bias to a rover for determining a position of the rover.

17. The apparatus of claim 16, wherein the instructions enable the processor to estimate the ionospheric phase bias per satellite while applying an ionospheric phase bias constraint.

18. The apparatus of claim 16, wherein the instructions further enable the processor to estimate an ionospheric differential code bias (DCB) per satellite using an ionospheric code observation and the ionospheric delay per epoch per receiver-satellite pairing.

19. The apparatus of claim 18, wherein the instructions enable the processor to estimate the ionospheric DCB per satellite while applying a differential code bias (DCB) constraint.

20. The apparatus of claim 16, wherein the instructions further enable the processor to cause the transmitter to transmit data representing the ionospheric model to the rover.

21. The apparatus of claim 20, wherein the data representing the ionospheric model comprises at least one of (i) a tag identifying a model, and (ii) parameters from which the ionospheric model can be reconstructed.

22. The apparatus of claim 16, wherein the instructions further enable the processor to cause the transmitter to transmit to the rover:

information from which a code leveled clock error per satellite and a phase leveled clock error per satellite is derivable, and at least one of (a) a Melbourne-Wübbena (MW) bias per satellite and (b) an ionospheric differential code bias per satellite.

23. The apparatus of claim 22, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

24. The apparatus of claim 16, wherein the instructions further enable the processor to cause the transmitter to transmit to the rover: a Melbourne-Wübbena (MW) bias per satellite, information from which a code leveled clock error per satellite and a phase leveled clock error per satellite is derivable, an ionospheric differential code bias per satellite, and information defining the ionospheric model.

25. The apparatus of claim 24, wherein the information from which a code leveled clock error per satellite and a phase leveled clock error per satellite is derivable comprises at least two of: (i) a code-leveled satellite clock, (ii) a phase-leveled satellite clock, and (iii) a satellite clock bias representing a difference between a code-leveled satellite clock and a phase-leveled satellite clock.

26. The apparatus of claim 16, wherein the ionospheric model is estimated with global network data, or obtained from Wide-Area Augmentation System (WAAS), Global Assimilative Ionospheric Model (GAIM), or IONosphere map EXchange (IONEX).

27. The apparatus of claim 16, wherein the instructions enable the processor to resolve the set of network ambiguities using a set of ambiguities estimated while generating a phase-leveled clock error per satellite.

28. The apparatus of claim 16, wherein the set of network ambiguities comprises ambiguities which are unique and correct in double-difference.

29. The apparatus of claim 16, wherein the instructions enable the processor to resolve the set of network ambiguities by determining a fixed integer value for each of the set of network ambiguities.

* * * * *